L. G. P. THRING.
PRESSURE INDICATOR OR RECORDER.
APPLICATION FILED MAR. 28, 1921.

1,398,608.

Patented Nov. 29, 1921.
3 SHEETS—SHEET 3.

Inventor:
L. G. P. Thring,
By Watson, Coit, Morse & Grindle,
Attorneys.

UNITED STATES PATENT OFFICE.

LEONARD GODFREY PINNEY THRING, OF CAMBRIDGE, ENGLAND.

PRESSURE INDICATOR OR RECORDER.

1,398,608.  Specification of Letters Patent.  Patented Nov. 29, 1921.

Application filed March 28, 1921. Serial No. 456,133.

*To all whom it may concern:*

Be it known that I, LEONARD GODFREY PINNEY THRING, a subject of the King of England, and residing at Cambridge, in England, have invented certain new and useful Improvements in Pressure Indicators or Recorders (for which I have filed application in Great Britain under No. 32,193, of 1919, dated 23d December, 1919, in the name of the present applicant,) of which the following is a specification.

This invention relates to pressure indicators or recorders and has for its object to provide an apparatus particularly suited for measuring and recording high and rapidly changing pressures, such for example, as are produced in the barrel of a gun or a rifle when discharge takes place, or in an internal combustion engine.

The words "indicator" and "indicating" are to be taken to include recorder and recording for the purposes of this specification.

According to this invention the indicator comprises a pressure member subjected to the pressure to be measured and placed in a state of compression thereby, a member placed in tension through the pressure member and a device such as a mirror or pointer so connected to the said members as to be rotated to an extent proportional to the sum of the compression of the first member and the extension of the second member and thereby caused to indicate or record the magnitude of the pressure, the whole indicator having a natural period of vibration which is short in comparison with the period of the pressure fluctuations, so that the instrument may be able to follow these fluctuations without being thrown into a state of vibration thereby, while each member is as far as the construction permits of uniform cross section throughout its length.

The number of members, which are subjected either to tension or compression under the action of the pressure to be measured, may be increased to any desired extent, but in a preferred arrangement two co-axial tubes rigidly connected together at their upper ends are employed. The inner tube constitutes a pressure member and has its lower end closed to form a plunger subjected to the pressure, while the outer tube constitutes a tension member and has its lower end adjacent to this plunger and fixed to the base plate of the indicator. Slots are provided in the walls of the tubes to allow the indicating device to be positioned outside the tubes.

The indicating device preferably consists of a mirror rigidly mounted on a flat spring or on a known spring controlled trunnion support and is provided with an arm to which one end of a longitudinally rigid connection is fixed. The other end of the rigid connection is fixed to the pressure member, so that movement of the pressure member applies torsion to the spring or rocks the mirror on its trunnions.

An indicator in accordance with this invention may be employed to produce either a pressure time curve or a true indicator diagram. In its simplest form, where a pressure time curve only is required, a sensitized sheet is moved uniformly in a direction parallel to the axis about which the indicating mirror is rotated by the pressure member, for instance the sheet may be mounted on a drum rotating at a known speed on an axis parallel to or coincident with that of the tube.

If it is desired to produce a pressure space curve or a true indicator diagram, the movement of the recording sheet is made proportional to the travel of the projectile in the bore of a gun or to that of a piston in the case of an internal combustion engine. Alternatively means may be provided for imparting a traverse motion to the indicating mirror. To this end a traverse table is conveniently employed and the flat spring which carries the mirror is clamped to this table. The traverse table is provided with steel points or the like so as to slide on the base plate of the indicator and is held thereon by spring clips or similar means. It is also adapted to rotate through a small angle about the axis of the pressure member, carrying with it the indicating mirror, so that the duration and the magnitude of the pressure to be measured are simultaneously indicated. In the case of a firearm the recoil is employed to impart traverse motion to the table and mirror. In certain cases when the recoil is large the traverse table may be dispensed with since the whole indicator will be moved sufficiently to record a complete indicator diagram.

Adjusting means are provided so that the position of the flat spring or of the trunnion support can be adjusted before the said spring or support is clamped to the traverse table. Since the traverse table in its rotation carries with it the indicating mirror it is necessary that the rigid connection between the plunger and the mirror arm should be placed centrally within the pressure member, and that the mirror should be free to rotate about the axis of the said member. To this end the rigid connection is formed into a strip so that it can twist about this axis in accordance with the motion of the traverse table, but it must yet remain sufficiently rigid longitudinally to transmit the motion of the plunger accurately to the mirror arm.

Mounted on the table and above the indicating mirror is a second adjustable mirror which is not connected to the pressure member but is adapted to be traversed with the table. As the mirror is not moved by the pressure it will reflect a line which is always at right angles to the axis of the tube, and serves as a datum line whereby the indicator diagram can be checked.

Conveniently the recoil actuated stop mechanism employed to impart traverse motion to the table and mirror comprises a rod or shaft connecting a member fixed to the traverse table to a fixed supporting member, which does not participate in the recoil movement. The rod carries a collar adapted to be engaged by a sleeve, fixed together with the base plate of the indicator to the breech block of the gun or rifle.

A simple form of high pressure indicator without a traverse table and a preferred construction provided with a traverse table, adapted for use in indicating or recording the pressure produced in the barrel of a gun or rifle when discharged takes place, are illustrated by way of example in the accompanying drawings, in which—

Figures 1, 5, 6, 9:
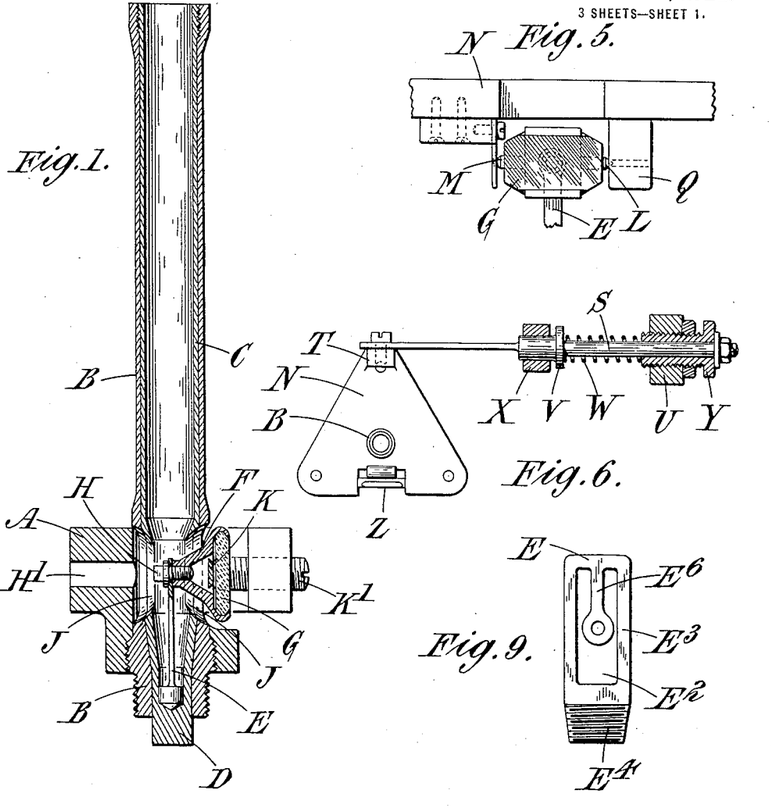
Figure 1 is a sectional side elevation of a simple form of pressure indicator.
Fig. 5 illustrates the alternative spring controlled trunnion support for the mirror.
Fig. 6 is a plan of the traverse table showing in section the recoil actuated stop mechanism.
Fig. 9 shows a further modification thereof.

The simple form of indicator illustrated in Fig. 1 comprises a base plate A into which is screwed or otherwise secured in some rigid manner the lower end of a tube B which projects through the base plate at right angles thereto. Disposed within this tube is an inner tube C the ends of which are adjacent to those of the upper tube B, the upper ends of the two tubes being formed integral or connected together in some rigid manner. The lower end D of the inner tube is closed or formed solid so as to constitute a plunger against which the pressure acts, and both tubes are as far as the construction permits of uniform cross section throughout their length. Thus the plunger D against which the pressure acts is directly supported by the tube C of uniform cross section which is disposed within and connected to an outer tube B in such a manner that the tube C is compressed and the tube B extended by the pressure acting on the plunger, the movement of the plunger D being equal to the sum of the extension and compression of the two tubes. Preferably the lower end of the outer tube B extends below the base plate and is screwthreaded for attachment to the breech block or other part of the breech mechanism (not shown in the drawings) which is suitably bored or chambered to permit of the pressure of the gases within the barrel having access to the plunger or pressure member within the end of the outer tube. Mounted within the inner tube C is a strut or plate E forming the longitudinally rigid connection between the plunger D and the arm F supporting the indicating mirror G. The actual form of strut employed and its method of attachment to the plunger and mirror arm may vary considerably, provided that no relative movement between the ends of the strut and the parts to which they are secured and no excessive bending of the strut due to its own inertia can occur. In the preferred forms of strut illustrated in the drawings, the upper end of the strut E is provided with a conically bored eye through which is passed a light screw H with a conical head. This screw H forms a light connection between the strut E and the mirror arm F of such a kind as to insure a minimum moment of inertia about the axis on which the mirror G rotates during the movement of the plunger. A hole H' is bored in the base plate of the indicator to permit the insertion and tightening of this screw.

Figure 7:
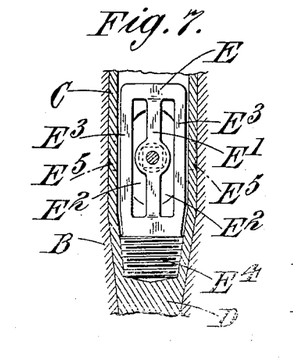
Figs. 7 and 8 are respectively a front elevation and a sectional side elevation of a modified form of strut.
Figure 8:
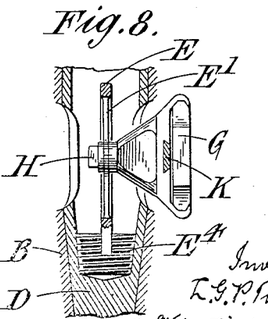

The body of the strut may be in the form of the flat plate or strip shown in Fig. 1 but other forms may be employed, such for example as are shown in Figs. 7, 8 and 9. In the form shown in Figs. 7 and 8, the mirror arm is supported at the center of the narrow strip E' formed between two longitudinal slots E² which are cut out of the strut E. This narrow strip E' can be made thinner than the part E³ of the strut in which it is held. A further modification is shown in Fig. 9, in which a slot $E^2$ is cut out from the strut so as to leave a metal tongue $E^6$ to hold the mirror arm. The same figures also show alternative methods of connecting the strut E to the plunger D. The strut may be made integral with or fixed to the plunger, as is shown in Fig. 1, or alternatively it may be secured to the sides of the inner tube C, for example, by means of a screw thread as in Figs. 7 and 8 or by lateral projections $E^5$ (shown dotted in Fig. 7) adapted to fit into grooves in the side walls of the inner tube C. By means of the last arrangement the strut may be made shorter without reducing the angle through which the mirror arm can rotate.

The walls of the inner and outer tubes B and C adjacent to the upper end of the strut E are slotted at J to permit the supporting frame or arm F of the mirror G to be connected to the strut, the mirror being carried outside the tubes. The indicating mirror G is thus connected to the plunger D in such a way that relative movement between the two ends of the tubes B and C causes the mirror to rotate about an axis perpendicular to that of the tubes.

To control the movement of the mirror G about this axis it is rigidly mounted on a flat transverse spring K the ends of which, in the simple form, are clamped to the base plate A of the indicator by means of a screw K'. To insure greater rigidity against bending in the plane of the spring the ends may be encastred by duplicating the screw K' at either end or in any other manner. Alternatively the mirror may be mounted on trunnions L and M as shown in Fig. 5, the trunnion L having a plain bearing in a fixed support, while the other trunnion M is supported in a flat spring which prevents any play in the bearing, the two trunnion supports in the simple form being respectively carried by and clamped to the base plate A.

Figures 2, 3, 4:
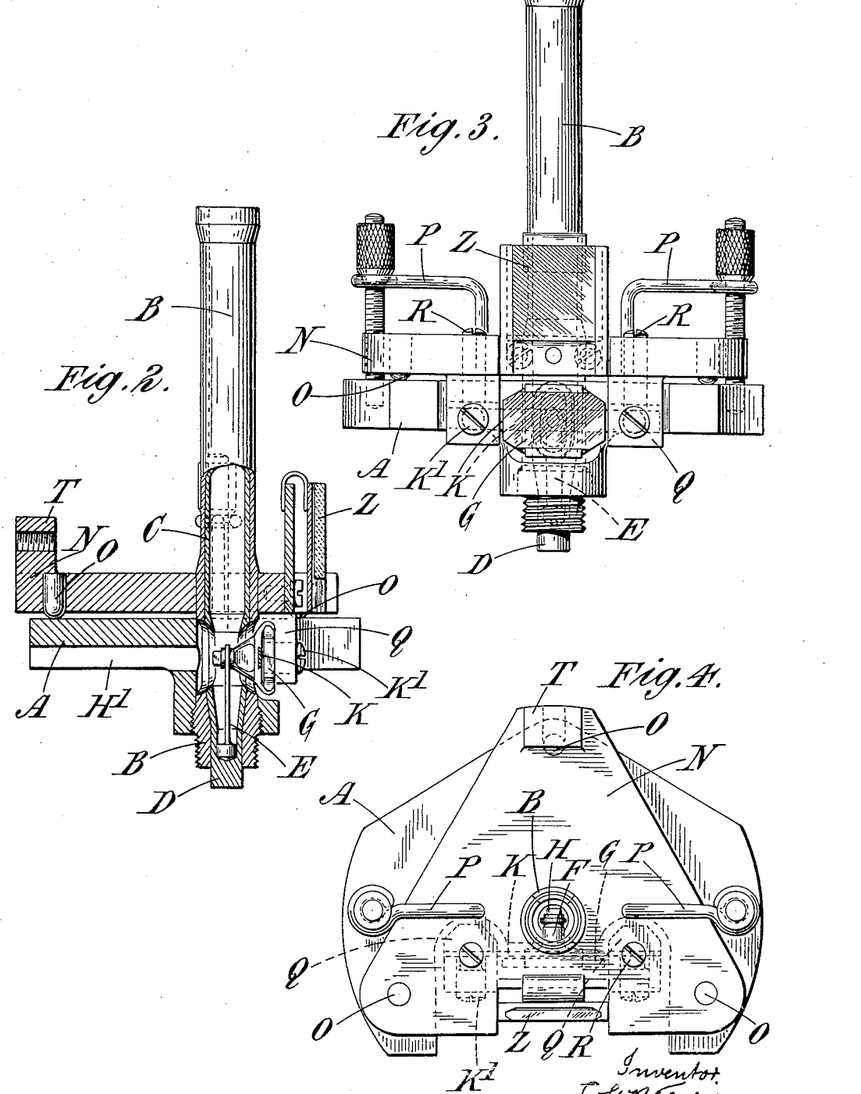
Figs. 2, 3 and 4 are respectively a sectional side elevation, a front elevation and a plan of a preferred construction.

In operation the simple form of indicator above described is screwed to the breech block of the gun or rifle in such a manner that the gases generated by the explosion exert pressure on the plunger D and consequently compress the tube C and extend the tube B so that the strut E moves upward and by applying torsion to the spring K rotates the mirror G. The mirror G reflects a spot of light on to a sensitized sheet moved parallel to the axis of rotation of the mirror, and a pressure time curve or a pressure space curve is produced on the sheet according as the sheet is moved uniformly or proportionally to the travel of the bullet in the barrel.

Where the recoil is small this simple form of indicator cannot conveniently produce a true indicator diagram or pressure space curve without the employment of some fairly complicated mechanism to provide for the necessary variable speed of movement of the sensitized sheet. To obviate this, the preferred form of indicator illustrated in Figs. 2, 3 and 4 is provided with means to give to the indicating mirror a traverse movement actuated by the recoil and proportional to the travel of the bullet or shell in the barrel.

This preferred construction incorporates all the parts described with reference to the simple construction illustrated in Fig. 1, with a slight variation in their arrangement hereinafter described, but it also includes a traverse table N supported on three steel points O or the like on the base plate A. This traverse table N is rotatable about the axis of the tubes B and C and the outer tube B has its walls slightly thickened to support the bearings on the traverse table. The three steel points O are held in contact with the upper surface of the base plate A by spring pressure members P which may be of any suitable form and are designed and arranged to permit slight rotary movement of the table, their lower ends bearing in holes or pockets in the table. The flat transverse spring K is, in this preferred construction, clamped not to the base plate A but to two supporting shoulders Q fixed to the traverse table. Adjusting screws R are provided whereby the position of the flat spring K and the mirror G which it carries may be adjusted to bring the mirror into a suitable initial position before the ends of the spring are clamped in position on the shoulders Q by the screws K'. Alternatively the trunnion support illustrated in Fig. 5 may be substituted for the flat spring K in this construction also.

In this preferred construction the strut E is placed centrally within the pressure tube C and is in the form of a metal strip so that it can twist about the axis of the tube and yield to the torsional force produced in it by the traversing of the mirror G, but it must still be sufficiently rigid longitudinally to transmit the motion of the plunger D accurately to the mirror arm F. Thus there is no lost motion between the pressure member and the indicating mirror.

The auxiliary mirror Z is adjustably mounted on the traverse table N so as to provide a datum line on the sensitized sheet whereby the indicator diagram can be checked.

Fig. 6 illustrates a preferred method by which the recoil is made to actuate the traversing table. The inner end of a rod or shaft S is formed into a strip and engages with a member T fixed to the traverse table N. The outer end of the rod S is carried in a bearing in a supporting bracket or standard U fixed to the ground or otherwise held stationary so that it does not participate in the recoil movement. A collar V fixed to the rod S is held away from the fixed supporting member U by a spring W. An arm or member ending in a sleeve X which slides on the rod S and engages with the collar V during the recoil, is fixed to the base plate A of the indicator and thereby also to the breech block or other recoiling portion of the gun or rifle. An adjusting nut Y is provided so that the effective length of the rod S may be varied.

After firing, the member X is forced by the recoil to slide along the rod S and after a short interval it engages the collar V. Until this engagement takes place the rod S and consequently also the slotted member T remain stationary, but the base plate A has also moved with the recoil and the traverse table N has therefore moved relative to the base plate. After the member X has engaged wth the collar V however, the rod S moves with the base plate A until the end of the recoil, and no further relative motion can occur between the traverse table N and the base plate A.

Figure 10:
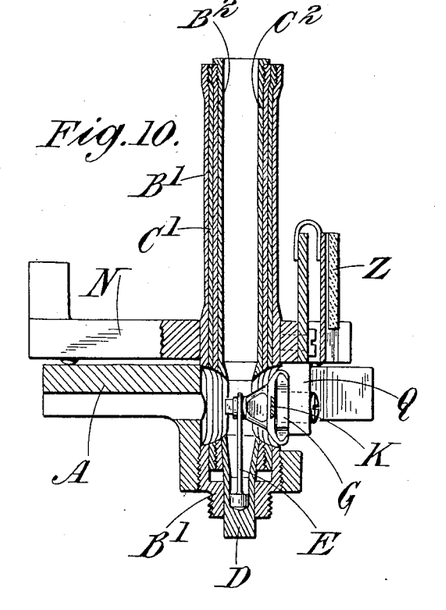
Fig. 10 is a longitudinal section through a modified form of the invention which has four concentric tubes instead of two.

Any number of pressure and tension members may be employed and in Fig. 10 a modified form of indicator is shown having two pressure members and two tension members. The construction of this form is the same as that shown in Figs. 2, 3 and 4 with the exception that instead of one inner tube C and one outer tube B, two tubes C' and $C^2$ are shown which are subjected to compression and two tubes B' and $B^2$ which are subjected to tension. The innermost tube $C^2$ is closed at its lower end to form a plunger D and the outermost tube $B^2$ is fixed to the plate A of the indicator.

Figure 11:
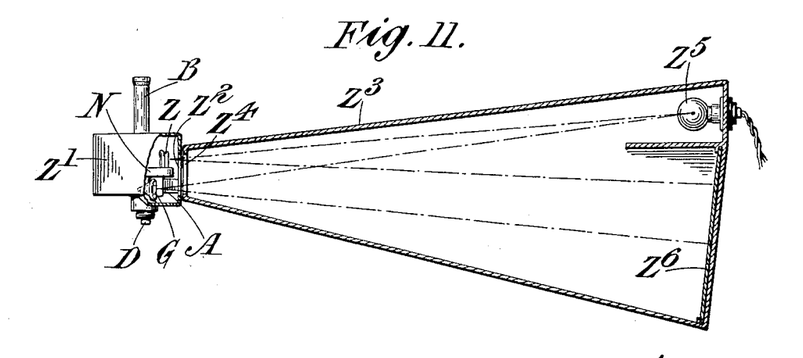
Fig. 11 illustrates diagrammatically a form of recording means suitable for use with the present indicator.

A simple form of recording means is illustrated diagrammatically by way of example in Fig. 11 and comprises a casing $Z^3$ having an opening $Z^4$ adapted to register with an opening $Z^2$ in a casing Z' surrounding the indicator and mounted on the base plate thereof, a point source of light $Z^5$ and a sensitive sheet $Z^6$. The source of light is so arranged that the rays therefrom impinge both on the indicating mirror G and the auxiliary mirror Z whence they are reflected to the sensitive sheet $Z^6$.

In operation the indicator is mounted on the breech block or other recoiling portion of the gun or rifle and the whole apparatus is inclosed within any suitable light proof casing, the light from a point source being reflected from the mirror on to a suitably positioned sensitized sheet. If the indicator is used for testing the pressure in a rifle barrel, the rifle is conveniently clamped in a vise mounted on a slide. The gases which are generated when discharge takes place are caused to act upon the closed end or plunger D of the inner tube C, whereupon relative movement between the lower ends of the tubes B and C is transmitted by the strut E to the indicating mirror G, causing this mirror to rotate about an axis perpendicular to the axis of the tube B and so applying torsion to the flat spring K on which it is mounted.

Simultaneously the recoil, through the stop mechanism above described, causes the traverse table N to rotate the indicating mirror G about the axis of the tube B, thereby twisting the shank of the strut E. The point of light reflected by this mirror G on to the sensitized sheet is thus caused to trace a true indicator diagram, in which the vertical coordinate represents pressure and the horizontal coördinate the length of the recoil.

The point of light reflected by the second mirror on the traversing table will serve to indicate in the first instance that the instrument is properly adjusted and not subjected to excessive vibration while further the straight line which it will produce on the sensitized sheet will serve as a datum line from which the indicator diagram can be checked.

It will be appreciated that the instrument described above is merely one form of the invention as applied to a particular purpose, namely measuring and recording the pressures produced in the barrel of a gun or rifle when discharge takes place. Obviously the construction of the instrument and its general arrangement will be modified to suit varying circumstances, the actual indicating member in some cases being in the form of a pointer if found convenient. Further the particular form of pressure member employed can be varied more especially in indicators for internal combustion engines or where a pointer is employed. For instance three concentric tubes may be used of which two are in compression and one in tension.

The pressure and tension members may be constructed out of any suitable material, which has a large amount of resilience and a certain amount of toughness, such for example, as various grades of high carbon steel, vanadium steel or nickel-chrome steel.

What I claim as my invention and desire to secure by Letters Patent is:—

1. In a fluid pressure indicator, in combination, an elongated substantially straight elastic member, one end of which is supported and the other end of which is free and adapted to be subjected to pressure to strain the member in the direction of its length, and a device associated with said member for indicating the amount of its deformation.

2. In a fluid pressure indicator, in combination, an elongated substantially straight elastic member, one end of which is supported and the other end of which is free and adapted to be subjected to pressure to strain the member in the direction of its length, and a mirror connected to the free end of said member to indicate the amount of its deformation.

3. In a fluid pressure indicator, in combination, an elongated substantially straight elastic member, one end of which is supported and the other end of which is free and adapted to be subjected to pressure to strain the member in the direction of its length, and an indicating element mounted on a relatively fixed base and connected to the free end of said member, to indicate the amount of its deformation.

4. In a fluid pressure indicator, in combination, an elongated substantially straight elastic member, one end of which is supported and the other end of which is free and adapted to be subjected to pressure to strain the member in the direction of its length, a relatively fixed base, and a mirror pivotally supported on the base and connected to the free end of the elastic member, for indicating the amount of deformation.

5. In an indicator of the type described, in combination, two elastic members secured together at one point, one of said members being supported on a relatively fixed base and the other member having a portion adapted to be subjected to pressure so that both of said members are strained thereby and a device for indicating the total of the added strains of both of said members.

6. In an indicator for high pressures, the combination of a pressure member, a tension member coacting with the pressure member, an indicating device, and means connecting the indicating device to the said members, such means being adapted to move the indicating device to an extent proportional to the sum of the compression of the pressure member and the extension of the tension member.

7. In an indicator for high pressures, the combination of a pressure member, a tension member coacting with the pressure member, an indicating device, means connecting the indicating device to the said members, such means being adapted to move the indicating device to an extent proportional to the sum of the compression of the pressure member and the extension of the tension member thus giving an indication of the magnitude of the pressure, the whole apparatus having a natural period of vibration which is short in comparison with that of the pressure fluctuations.

8. An indicator of high pressures comprising a plurality of members one of which is subjected to the pressure to be measured, a tension member coacting with the pressure member so that it will be in a state of tension when the pressure member is compressed, an indicating device, and means connecting the indicating device to the said members, such means being adapted to move the indicating device to an extent proportional to the sum of the compression of the pressure member and the extension of the tension member thus giving an indication of the magnitude of the pressure, the whole apparatus having a natural period of vibration which is short in comparison with that of the pressure fluctuations and each member being of uniform cross section throughout its length as set forth.

9. An indicator for high pressures, comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member, a rotatable indicating device and means connecting the indicating device to the plunger, as set forth.

10. An indicator for high pressures comprising a base plate, an inner tube having its lower end closed to form a plunger subjected to the pressure to be measured, such tube constituting a pressure member, an outer tube coaxial with and rigidly connected at its upper end to the tube and having its lower end adjacent to the plunger and secured to the base plate, such outer tube constituting a tension member, a rotatable indicating device, means connecting the indicating device to the plunger, such means being adapted to rotate the indicating device to an extent proportional to the sum of the compression of the inner tube and the extension of the outer tube, the whole apparatus having a natural period of vibration which is short in comparison with that of the pressure fluctuations.

11. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member, a rotatable indicating device, slots in the walls of the tubes to permit the indicating device to be positioned outside the tubes, and means connecting the indicating device to the plunger, such means being adapted to rotate the indicating device to an extent proportional to the sum of the compression of the inner tube and the extension of the outer tube as set forth.

12. In an indicator for high pressures, the combination of a pressure member adapted to be subjected to the pressure to be measured, a tension member coacting with the pressure member so that it will be in a state of tension when the pressure member is compressed, a rotatable indicating mirror, and means connecting the indicating mirror to the said members, such means being adapted to rotate the indicating mirror to an extent proportional to the sum of the compression of the pressure member and the extension of the tension member thus giving an indication of the magnitude of the pressure as set forth.

13. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating mirror, and means connecting the indicating mirror to the plunger, such means being adapted to rotate the indicating mirror to an extent proportional to the sum of the compression of the inner tube and the extension of the outer tube as set forth.

14. In an indicator for high pressures, the combination of a pressure member adapted to be subjected to the pressure to be measured, a tension member coacting with the pressure member so that it will be in a state of tension when the pressure member is compressed, a rotatable indicating mirror, a flat spring upon which the mirror is rigidly mounted and which serves as a pivot about which the mirror can rotate, and means connecting the indicating mirror to the said members, such means being adapted to rotate the indicating mirror to an extent proportional to the sum of the compression of the pressure member and the extension of the tension member thus giving an indication of the magnitude of the pressure as set forth.

15. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating mirror, a flat spring on which the mirror is rigidly mounted and which serves as a pivot about which the mirror can rotate, and means connecting the indicating mirror to the plunger, such means being adapted to rotate the indicating mirror to an extent proportional to the sum of the compression of the inner tube and the extension of the outer tube as set forth.

16. In an indicator for high pressures, the combination of a pressure member adapted to be subjected to the pressure to be measured, a tension member coacting with the pressure member so that it will be in a state of tension when the pressure member is compressed, a rotatable indicating mirror, a flat spring upon which the mirror is rigidly mounted and which serves as a pivot about which the mirror can rotate, an arm fixed to the mirror, and a longitudinal rigid connection between the pressure member and the mirror arm of such a kind that movement of the pressure member applies torsion to the flat spring and rotates the mirror thus giving an indication of the magnitude of the pressure as set forth.

17. In an indicator for high pressures, the combination of a pressure member adapted to be subjected to the pressure to be measured, a tension member coacting with the pressure member so that it will be in a state of tension when the pressure member is compressed, a base plate, a rotatable indicating device, a traverse table adapted to slide on the base plate of the indicator and to rotate thereon through a small angle about the axis of the pressure member, a support for the indicating device clamped to shoulders on the said table, means connecting the indicating device to the said members, and means for simultaneously rotating the traverse table and the indicating device so that the duration and the magnitude of the pressure are simultaneously indicated as set forth.

18. In an indicator for high pressures, the combination of a pressure member adapted to be subjected to the pressure to be measured, a tension member coacting with the pressure member so that it will be in a state of tension when the pressure member is compressed, a base plate, a rotatable indicating device, a traverse table adapted to slide on the base plate of the indicator and to rotate thereon through a small angle about the axis of the pressure member, a support for the indicating device clamped to shoulders on the said table, means connecting the indicating device to the said members, means for simultaneously rotating the traverse table and the indicating device so that the duration and the magnitude of the pressure are simultaneously indicated.

19. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating device, a traverse table adapted to slide on the base plate of the indicator and to rotate thereon through a small angle about the axis of the tubes, a support for the indicating device clamped to shoulders on the said table, means connecting the indicating device to the plunger, and means for simultaneously rotating the traverse table and the indicating device so that the duration and magnitude of the pressure are simultaneously indicated as set forth.

20. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating mirror, a traverse table adapted to slide on the base plate of the indicator and to rotate thereon through a small angle about the axis of the tubes, a flat spring upon which the mirror is rigidly mounted and which is clamped to shoulders on the said table thus serving as a pivot about which the mirror can rotate, means connecting the indicating mirror to the plunger, and means for simultaneously rotating the traverse table and the indicating mirror so that the duration and magnitude of the pressure are simultaneously indicated as set forth.

21. In an indicator for high pressures the combination of a pressure member adapted to be subjected to the pressure to be measured, a tension member coacting with the pressure member so that it will be in a state of tension when the pressure member is compressed, a base plate, a rotatable indicating mirror, a traverse table adapted to slide on the base plate of the indicator and to rotate thereon through a small angle about the axis of the pressure member, a flat spring upon which the mirror is rigidly mounted and which is clamped to shoulders on the said table thus serving as a pivot about which the mirror can rotate, an arm fixed to the mirror, a longitudinally rigid connection between the pressure member and the mirror arm, means for simultaneously rotating the traverse table and the indicating mirror so that the duration and magnitude of the pressure are simultaneously indicated, the longitudinally rigid connection being placed substantially centrally within the pressure member and formed as a strip so that it can twist through a small angle in accordance with the motion of the traverse table but yet remain sufficiently rigid longitudinally to transmit the motion of the pressure member accurately to the indicating mirror as set forth.

22. An indicator for high pressures comprising a base plate, an inner tube having its lower end closed to form a plunger subjected to the pressure to be measured, such tube constituting a pressure member and being placed in a state of compression when the pressure acts, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating device, a traverse table adapted to slide on the base plate of the indicator and to rotate thereon through a small angle about the axis of the tube, spring pressure members adapted to hold the traverse table on to the base plate, a support for the indicating device clamped to shoulders on the said table, means connecting the indicating device to the plunger, and means for simultaneously rotating the traverse table and the indicating device so that the duration and magnitude of the pressure are simultaneously indicated as set forth.

23. An indicator for high pressures comprising a base plate, an inner tube having its lower end closed to form a plunger subjected to the pressure to be measured, such tube constituting a pressure member, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating mirror, a traverse table adapted to slide on the base plate of the indicator and to rotate thereon through a small angle about the axis of the tubes, a support for the indicating mirror clamped to shoulders on the said table, means connecting the indicating mirror to the plunger, means for simultaneously rotating the traverse table and the indicating mirror so that the duration and magnitude of the pressure are simultaneously indicated, means for recording the indications given by the indicating mirror, and an auxiliary mirror adjustably mounted on the traverse table so as to indicate the motion thereof and to provide a datum line on the record of the indication whereby the pressure diagram may be checked as set forth.

24. In an indicator for high pressures, the combination of a pressure member adapted to be subjected to the pressure to be measured, a tension member coacting with the pressure member so that it will be in a state of tension when the pressure member is compressed, a base plate, a rotatable indicating mirror, a traverse table adapted to slide on the base plate of the indicator and to rotate thereon through a small angle about the axis of the pressure member, a support for the indicating mirror clamped to shoulders on the said table, means connecting the indicating mirror to the said members, means for simultaneously rotating its traverse table and the indicating mirror so that the duration and the magnitude of the pressure are simultaneously indicated, means for recording the indications given by the indicating mirror, and an auxiliary mirror adjustably mounted on the traverse table so as to indicate the motion thereof and to provide a datum line on the record of the indication whereby the pressure diagram may be checked as set forth.

25. In a pressure indicator for guns, rifles or the like, the combination of a pressure member adapted to be subjected to the pressure to be measured, a tension member coacting with the pressure member so that it will be in a state of tension when the pressure member is compressed, a base plate, a rotatable indicating device, a traverse table adapted to slide on the base plate of the indicator and to rotate thereon through a small angle about the axis of the pressure member, a support for the indicating device clamped to shoulders on the said table, means connecting the indicating device to the said members, means to rotate the indicating device, and a recoil actuated stop mechanism adapted to rotate the traverse table so that the duration and the magnitude of the pressure are simultaneously indicated as set forth.

26. In a pressure indicator for guns, rifles or the like, the combination of a pressure member adapted to be subjected to the pressure to be measured and placed in a state of compression thereby, a tension member coacting with the pressure member so that it will be in a state of tension when the pressure member is compressed, a base plate, a rotatable indicating device, a traverse table adapted to slide on the base plate of the indicator and to rotate thereon through a small angle about the axis of the pressure member, a support for the indicating device clamped to shoulders on the said table, means connecting the indicating device to the said members, means to rotate the indicating device, and a recoil actuated stop mechanism adapted to rotate the traverse table so that the duration and the magnitude of the pressure are simultaneously indicated.

27. A pressure indicator for guns, rifles or the like comprising a base plate, an inner tube having its lower end closed to form a plunger subjected to the pressure to be measured, such tube constituting a pressure member and being placed in a state of compression when the pressure acts, an outer tube coaxial with and rigidly connected at its upper end to the inner tube and having its lower end adjacent to the plunger and secured to the base plate, such outer tube constituting a tension member so that it will be in a state of tension when the inner tube is compressed, a rotatable indicating device, a traverse table adapted to slide on the base plate of the indicator and to rotate thereon through a small angle about the axis of the tubes, a support for the indicating device clamped to shoulders on the said table, means connecting the indicating device to the plunger, means to rotate the indicating device, and a recoil actuated stop mechanism adapted to rotate the traverse table so that the duration and the magnitude of the pressure are simultaneously indicated as set forth.

28. An indicator for high pressures comprising a plurality of members one of which is subjected to the pressure to be measured, a tension member coacting with the pressure members, an indicating device, and means connecting the indicating device to the said members, said means being adapted to move the indicating device to an extent proportional to the sum of the compression of the pressure members and the extension of the tension member, the whole apparatus having a natural period of vibration which is short in comparison with that of the pressure fluctuations and each member being substantially of uniform cross section throughout its length as set forth.

29. An indicator for high pressures comprising a plurality of pressure members one of which is subjected to the pressure to be measured, a plurality of tension members coacting with the pressure members, an indicating device, and means connecting the indicating device to the said members, said means being adapted to move the indicating device to an extent proportional to the sum of the compression of the pressure members and the extension of the tension members, the whole apparatus having a natural period of vibration, which is short in comparison to that of the pressure fluctuations and each member being substantially of uniform cross section throughout its length.

30. An indicator for high pressures comprising a base plate, an inner tube having its lower end closed to form a plunger subjected to the pressure to be measured, an outer tube coaxial with and rigidly connected at its upper end to the inner tube and having its lower end adjacent to the plunger and secured to the base plate, said outer tube constituting a tension member, a rotatably indicating mirror, means connecting the indicating mirror to the plunger, such means being adapted to rotate the indicating mirror to an extent proportional to the sum of the compression of the inner tube and the extension of the outer tube, and means for recording the indications given by the indicating mirror as set forth.

31. In a fluid pressure indicator, in combination, a substantially straight elastic member adapted to be strained in the direction of its length when subjected to pressure, a device associated therewith for indicating the amount of deformation, and means co-operating with said device for recording deformations indicated thereby.

32. An indicator for high pressures comprising a base plate, an inner tube having its lower end closed to form a plunger subjected to the pressure to be measured, an outer tube coaxial with and rigidly connected at its upper end to the inner tube and having its lower end adjacent to the plunger and secured to the base plate, such outer tube constituting a tension member, a rotatable indicating device, a traverse table adapted to slide on the base plate of the indicator and to rotate thereon through a small angle about the axis of the tubes, the spring pressure members adapted to hold the traverse table on to the base plate, a support for the indicating device clamped to shoulders on said table, means connecting the indicating device to the plunger, and means for simultaneously rotating the traverse table and the indicating device so that the duration and magnitude of the pressure are simultaneously indicated as set forth.

In testimony whereof I have signed my name to this specification.

LEONARD GODFREY PINNEY THRING.